United States Patent [19]

Flanagan

[11] Patent Number: 5,506,838
[45] Date of Patent: Apr. 9, 1996

[54] PACKET PROPAGATION AND DYNAMIC ROUTE DISCOVERY APPARATUS AND TECHNIQUES

[75] Inventor: Kevin L. Flanagan, Boxborough, Mass.

[73] Assignee: EMC Corporation, Hopkinton, Mass.

[21] Appl. No.: 366,031

[22] Filed: Dec. 29, 1994

[51] Int. Cl.⁶ .............................. H04J 3/14; H04L 12/56
[52] U.S. Cl. ........................... 370/54; 370/60; 370/94.3; 370/85.12
[58] Field of Search ............................. 370/54, 60, 94.1, 370/94.3, 85.13, 85.14, 85.12, 85.15, 85.9, 17

[56] References Cited

U.S. PATENT DOCUMENTS

| | | | |
|---|---|---|---|
| 4,672,373 | 6/1987 | Mori et al. | 370/94.3 |
| 4,736,465 | 4/1988 | Bobey et al. | 370/55 |
| 4,742,511 | 5/1988 | Johnson | 370/85.9 |
| 4,797,882 | 1/1989 | Maxemchuk | 370/60 |
| 4,933,933 | 6/1990 | Dally et al. | 370/60 |
| 5,003,533 | 3/1991 | Watanabe | 370/85.15 X |
| 5,034,945 | 7/1991 | Kimoto et al. | 370/13.1 |
| 5,105,424 | 4/1992 | flaig et al. | 370/94.1 |
| 5,245,609 | 9/1993 | Ofek et al. | 370/94.3 |
| 5,323,394 | 6/1994 | Perlman | 370/54 |
| 5,444,701 | 8/1995 | Cypher et al. | 370/94.3 X |

*Primary Examiner*—Douglas W. Olms
*Assistant Examiner*—Min Jung
*Attorney, Agent, or Firm*—Weingarten, Schurgin, Gagnebin & Hayes

[57] ABSTRACT

A method and apparatus for propagating information, such as node status and routing information, to nodes connected to a network. Each node has at least two ports connected to at least two different data links, such as rings. An information packet is transmitted by one or more nodes to every other node connected directly to a common data link. The receiving node determines whether the packet has been previously received. If the packet has not been previously received, then the receiving node stores the information contained in the packet and modifies the packet for forwarding to other nodes directly connected to the receiving node (and indirectly connected to the transmitting node). If the packet has been previously received, then propagation of the packet is terminated. In one embodiment, nodes learn the network configuration, including the address of other nodes connected to the network and paths for routing packets to such other nodes.

20 Claims, 7 Drawing Sheets

| 31-28 | 27-24 | 23 | 22-19 | 18 | 17-14 | 13 | 12-9 | 8 | 7-3 | 2-0 |
|---|---|---|---|---|---|---|---|---|---|---|
| TYPE | SENDER SLOT | SENDER PORT | HOP1 SLOT | HOP1 PORT | HOP2 SLOT | HOP2 PORT | HOP3 SLOT | HOP3 PORT | RE-SERVED | HCNT |
| 154 | 158 | 162 | 166 | 170 | 174 | 178 | 182 | 186 | 190 | 194 |

| 31-28 | 27-20 | 19-16 | 15-12 | 11-10 | 9-8 | 7-0 |
|---|---|---|---|---|---|---|
| TYPE | SENDER SLOT | RING A PORT ADDRESS | RING B PORT ADDRESS | PORT STATUS | INFO REQUEST | NODE TYPE |
| 204 | 208 | 212 | 216 | 220 | 224 | 228 |

PACKET PROPAGATION AND DYNAMIC ROUTE DISCOVERY APPARATUS AND TECHNIQUES

FIELD OF THE INVENTION

This invention relates generally to propagating information to nodes connected to a communications network and more particularly, to a method for propagating network configuration information for use in routing packets.

BACKGROUND OF THE INVENTION

Communications networks which include a plurality of interconnected components, or nodes are known. A communications network is a data processing system which includes a plurality of interconnected nodes, such as workstations, data storage devices, printers, servers, etc. The nodes are interconnected by a data link and communicate by transmitting and receiving messages, or packets to and from other nodes. Packets generally include a header and a payload, such as data.

Various techniques are employed for routing packets from a transmitting, or source node to a receiving, or destination node. Such techniques typically optimize one or more transmission criteria, such as minimizing congestion over a particular bus, or minimizing the distance that the packets travel to reach the destination node. Common to packet routing techniques is the need for each node to know the architecture, or configuration, of the network, since a source node must know the address, and preferably also the status, of a destination node in order to successfully transmit a packet to the destination node.

One technique for providing each node with the address and/or status of other nodes connected to the network is to download a "system map" from a central source, such as a system console, to each of the nodes at system initialization. In operation, when a node is added to the network, removed from the network, or experiences a failure, the central source must recognize this node status change and update the system map for subsequent downloading to each of the nodes in order to update the system map maintained by each of the nodes. However, the operator intervention necessary to update the central source with node status changes may be undesirable. Furthermore, the operator generated system map may be subject to errors.

Another technique for providing nodes with network configuration information is to use a central authority for "automatically" collecting network topology information from the nodes and then distributing the collected information to each of the nodes. However, use of such a central authority requires a separate, dedicated bus for communicating with each of the nodes since, without the network topology information, a node cannot "find" the central authority to provide the central authority with its information. Thus, this technique disadvantageously requires a maintenance bus, or other secondary bus system, to communicate the network configuration information to the central authority for collection and subsequent distribution.

One technique for propagating a packet to nodes connected to a network is to provide a "time to live" counter field in the packets. The "time to live" field is set to a predetermined value and decremented each time the packet is transmitted through a node. The packet is discarded after the counter has been decremented to zero. Use of this technique as a way of propagating network configuration information is constrained by the predetermined value to which the "time to live" field is initialized. That is, since it is desirable to set the "time to live" field to a value large enough to ensure propagation of the packet to the desired nodes, but not so large as to result in unnecessary packet propagation, the optimum value is a function of the number of network nodes and thus, requires prior knowledge of the network configuration.

Another technique for packet propagation is called the spanning tree algorithm. This technique restricts the logical topology of the network to require that each packet be routed toward a dedicated node, referred to as the root. More particularly, certain ports of nodes are disabled to prevent packet routing through loops of the physical network topology. Since the routing path toward the root may not be the optimum transmission path, for example in terms of packet congestion or distance travelled, the efficiency of using the spanning tree algorithm as a way to propagate network configuration information may suffer.

SUMMARY OF THE INVENTION

Methods and apparatus are presently disclosed which provide for propagating information to nodes connected to a network in a manner that does not require prior knowledge of the network configuration, restrict network topology, require a dedicated bus system, require operator intervention or suffer other drawbacks heretofore associated with packet propagation. Illustrative information propagated include network configuration information, such as node status and packet routing information. The invention operates dynamically to update network configuration information maintained by each node upon a change in the configuration, such as the addition of a new node or the failure of a node or port thereof.

Each node is connected to at least a pair of interconnecting segments or data links, such as a bus or rings, with each such segment having multiple nodes connected thereto. The packet propagation technique includes the steps of transmitting a packet from one or more source nodes to every node connected directly to a common segment. Each node receiving a packet determines whether the information contained in the packet has been previously received. If the information is new, then the receiving node records the packet information and forwards the packet to other nodes directly connected to the receiving node and indirectly connected to the source node (i.e., those nodes directly connected to the same segment as a non-receiving port of the receiving node). If the information has been previously received, then propagation of the packet is terminated to prevent unnecessary packet transmissions.

In one embodiment, the information propagation technique is used to teach each node a plurality of paths for routing packets to other nodes on the network. To this end, at system initialization, discovery packets, containing the route over which the respective packet travels, are propagated by each node in accordance with the above- described technique. In response to receipt of a discovery packet containing a previously unreceived route, the receiving node adds the route contained in the packet to a routing table maintained in memory. The receiving node further modifies the packet to identify itself and forwards the modified packet to nodes directly connected to the segment to which the non-receiving port of the receiving node is connected.

In accordance with a further embodiment, the propagation technique is used to update the routing table maintained by each node with routes to a new node added to the network.

To this end, when a new node is added to the network during operation, a discovery packet is transmitted by the new node to other nodes connected to the network in accordance with the above-described propagation technique. In response to a discovery packet received during operation (i.e., indicating that a new node has been added to the network), the receiving node sends a routing information packet directly to the new node. The new node stores the route specified in each received routing information packet to build a routing table containing paths to other nodes on the network.

Also described is the use of the packet propagation technique for updating the routing table maintained by each node with status changes associated with other nodes. To this end, one or more of the nodes periodically transmits a node status packet to other nodes to which the transmitting node is directly connected. The node status packet indicates the status of the ports of the transmitting node. If the node status specified in a received node status packet has not been previously received, then the receiving node forwards the node status packet to nodes directly connected to its non-receiving port. Furthermore, if a node monitoring other nodes does not receive a node status packet from each monitored node within a specified time, then the routing table of the monitoring node is purged of routes including the monitored node.

BRIEF DESCRIPTION OF THE DRAWINGS

The foregoing features of this invention may be more fully understood from the following detailed description of the invention in conjunction with the drawings in which:

FIG. 4A shows an illustrative routing payload format associated with a route discovery packet or a routing information packet;

FIG. 4B shows an illustrative status payload format associated with a node status packet;

DESCRIPTION OF THE PREFERRED EMBODIMENT

Figure 1:
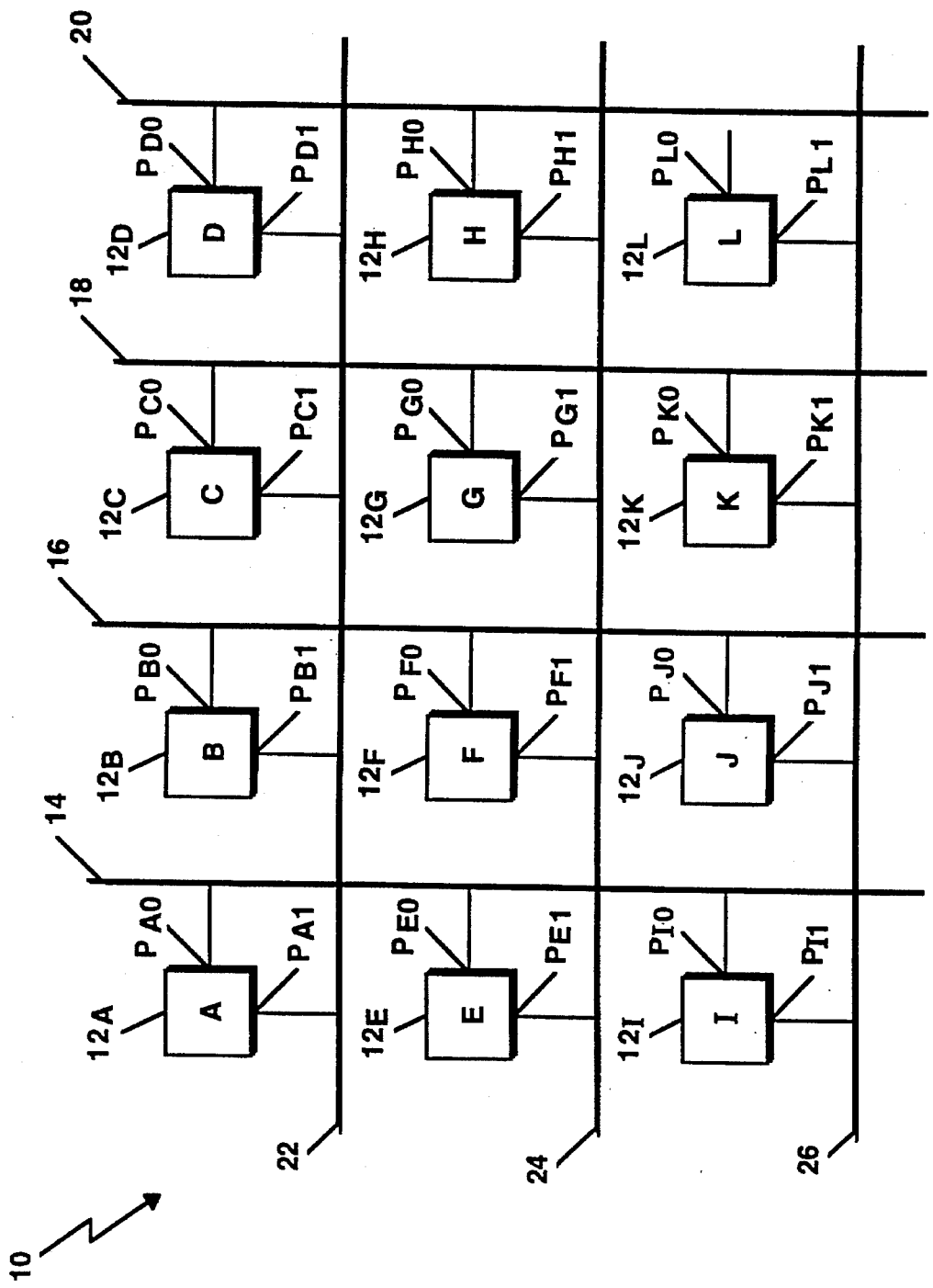
FIG. 1 is a diagram of an illustrative network comprising multiple interconnected nodes.
Figure 7:
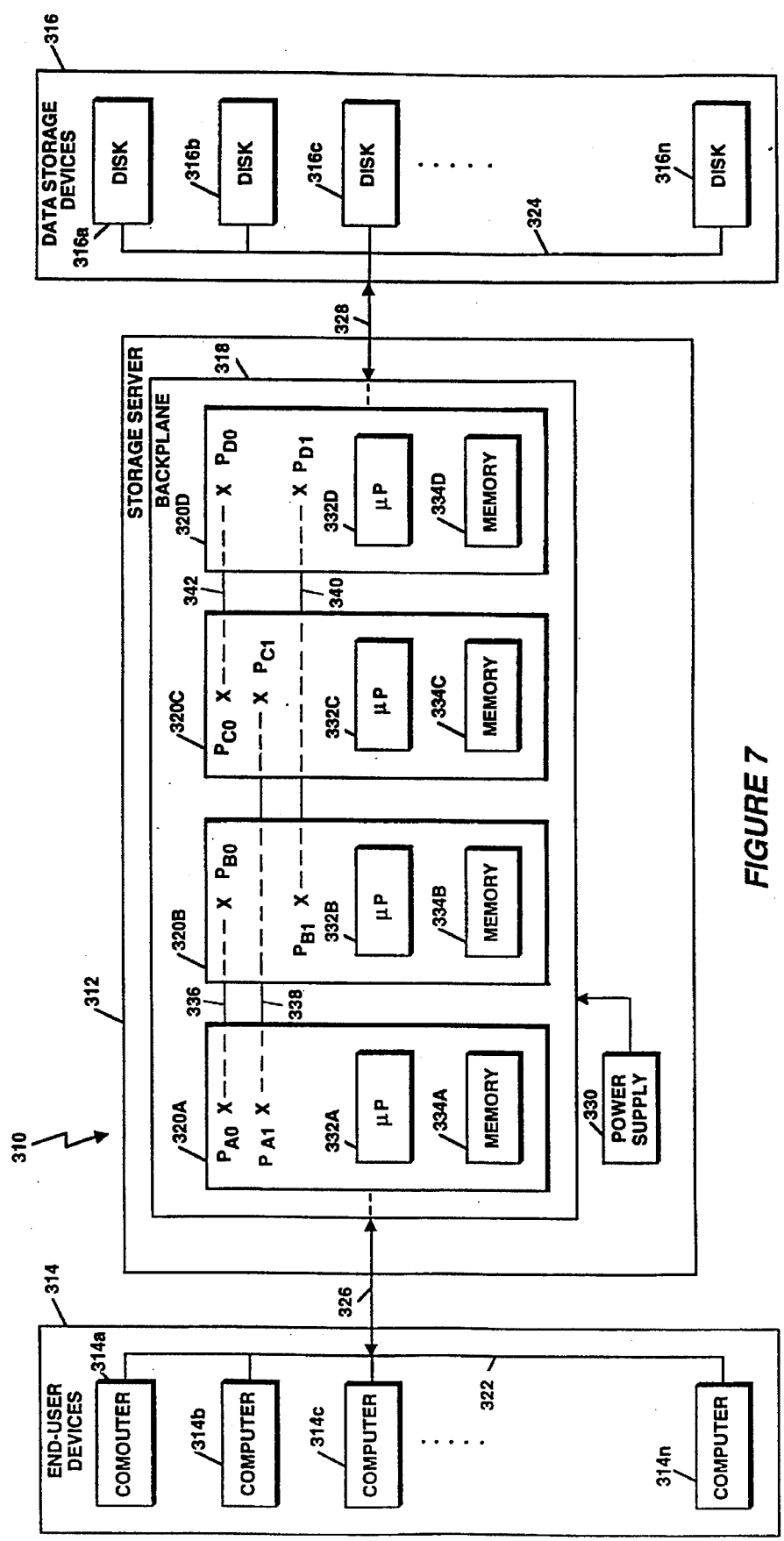
FIG. 7 is a diagram of a computer network data processing system including a storage server utilizing the packet propagation technique of the present invention.

Referring to FIG. 1, a communications network 10 includes a plurality of interconnected nodes, or system components $12_A$–$12_L$. The network 10 may be of various types, such as a computer system, in which each of the nodes $12_A$–$12_L$ is a central processor unit (CPU) board, a disk controller board or a memory board. Another illustrative type of network 10 is a storage server, in which the nodes $12_A$–$12_L$ are disk controller boards, as shown in the embodiment of FIG. 7. It will be appreciated however, that the apparatus and techniques described herein are suitable for use with various other types of networks.

Each of the nodes $12_A$–$12_L$ has "n" ports for connection to "n" different interconnecting segments, such as ring-like data buses, or rings 14–26. In the illustrative embodiment, each node $12_A$–$12_L$ has two ports $P_{A0}$, $P_{A1}$–$P_{L0}$, $P_{L1}$, respectively, for connection to two different rings 14–26, as shown. Although the rings 14–26 are shown diagrammatically in FIG. 1 as linear segments, each such segment is a ring 14–26 in the presently disclosed embodiments. The intersections between rings 14–26 are not physical interconnections, as will become apparent by reference to FIG. 2. Preferably, the n×m arrangement of nodes $12_A$–$12_L$ are interconnected by rings 14–26 in a manner that provides enhanced fault tolerance, as described in a co-pending patent application Ser. No. 08/275,005 filed Jul. 13, 1994, entitled FAULT TOLERANT INTERCONNECT TOPOLOGY, assigned to the Assignee of the present invention, and incorporated herein by reference.

In one embodiment, each of the nodes $12_A$–$12_L$ is housed in a slot of a cabinet and the network 10 may contain one or more such cabinets. Thus, each node $12_A$–$12_L$ has a slot address associated therewith which identifies the slot occupied by the node. Additionally, each port $P_{A0}$, $P_{A1}$–$P_{L0}$, $P_{L1}$ of each node $12_A$–$12_L$, respectively, has an address specifying the position of the port on the ring 14–26 to which the port is connected. It will be appreciated that the number of nodes $12_A$–$12_L$ connected to the network 10 may be readily varied.

Each node $12_A$–$12_L$ is directly connected to other nodes on a common ring 14–26 and is indirectly connected to other nodes which are not connected to a common ring. For example, node $12_A$ is directly connected to nodes $12_B$, $12_C$ and $12_D$ via common ring 22 and is further directly connected to nodes $12_E$ and $12_I$ via common ring 14, but is indirectly connected to the remaining nodes $12_F$–$12_H$ and $12_J$–$12_L$. Packets are transferred between two indirectly connected nodes through a third node (i.e., by "hopping" across a bridge of the third node). For example, a packet transmitted from node $12_A$ to node $12_F$ may be transmitted from node $12_A$ to node $12_E$ via ring 14 and then from node $12_E$ to node $12_F$ via ring 24.

Figure 2:
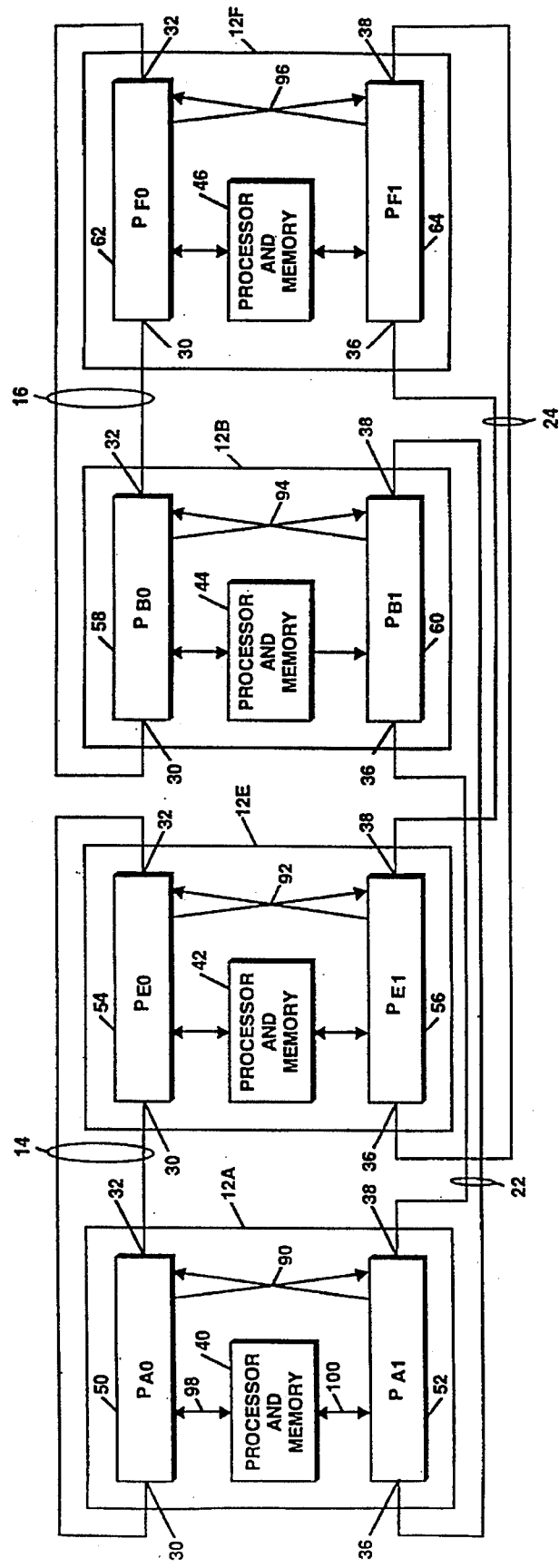
FIG. 2 is a diagram of four illustrative nodes of FIG. 1.

Referring also to FIG. 2, four illustrative nodes $12_A$, $12_B$, $12_E$ and $12_F$ of the network 10 of FIG. 1 are shown in greater detail. The first port $P_{A0}$, $P_{B0}$, $P_{E0}$, and $P_{F0}$ of each node $12_A$, $12_B$, $12_E$ and $12_F$, respectively, includes a pair of terminals 30, 32 and the second port $P_{A1}$, $P_{B1}$, $P_{E1}$, and $P_{F1}$ of each node $12_A$, $12_B$, $12_E$ and $12_F$, respectively, include a pair of terminals 36, 38. A first one of the terminals 30, 36 associated with each port $P_{A0}$, $P_{A1}$, $P_{B0}$, $P_{B1}$, $P_{E0}$, $P_{E1}$ and $P_{F0}$, $P_{F1}$ is an input port to the respective node from a ring and a second terminal 32, 38 is an output port from the respective node to a ring. In the illustrative embodiment, each of the ports $P_{A0}$, $P_{A1}$, $P_{B0}$, $P_{B1}$, $P_{E0}$, $P_{E1}$, and $P_{F0}$, $P_{F1}$ comprises a respective interface circuit 50, 52, 54, 56, 58, 60, and 62, 64, as shown. Each of the nodes $12_A$, $12_B$, $12_E$ and $12_F$ includes a processor and memory unit 40, 42, 44, 46, respectively, connected to the interface circuits of the node by bi-directional signal lines 98, 100, labelled in illustrative node $12_A$.

In a preferred embodiment, each of the devices 50–64 is a QuickRing™ interface circuit, manufactured by National Semiconductor, as described in the QuickRing™ QR0001 and QR1001 Data Stream Controller data sheets dated June 1994 and incorporated herein by reference. Each QuickRing™ interface circuit 50–64 reformats received 32-bit data into a 42-bit packet including, in addition to the 32-bits of data, one frame bit, two control bits and seven bits of error detection code. Use of the QuickRing™ interface circuits permits data transmission on interconnect rings 14–26 at a rate of at least 200 MBps. When QuickRing™ interface circuits are used, preferably each ring 14–26 is connected to no more than eight nodes and in a preferred embodiment, each ring is connected to four nodes.

Also provided on each node $12_A$, $12_B$, $12_E$ and $12_F$ is a bridge 90–96, respectively. Bridges 90–96 permit data transfer between the two rings to which the respective node is connected. For example, the bridge 90 of exemplary node $12_A$ is connected between interface circuit 50 associated with port $P_{A0}$ and interface circuit 52 associated with port $P_{A1}$ to permit communication between the two rings 14 and 22 to which the node $12_A$ is connected. It is noted that the internal node structure shown in FIG. 2 is illustrative only and various other arrangements are possible, as described in the above-referenced co-pending patent application.

Packets transferred between the nodes $12_A$–$12_L$ generally include a header (referred to as header 110) and a payload, such as data. Although the apparatus and techniques of the present invention are applicable for use in transmitting packets of varied formats, the illustrative packets described herein have a QuickRing™ format, in accordance with which the header 110 is a thirty-two bit word and the payload is either a second, thirty-two bit word (i.e., providing a low bandwidth packet) or includes seventy-nine additional thirty-two bit words (i.e., providing a "normal" packet). When a packet is bridged by a bridge 90–96, the receiving one of the QuickRing™ interface circuit 50–64 (FIG. 2) rotates the contents of the packet header 110. Thus, a packet transmitted by a transmitting, or source node has a first format, labelled 110' in FIG. 3, and a bridged packet has a second, rotated format, labelled 110" in FIG. 3.

Figure 3:
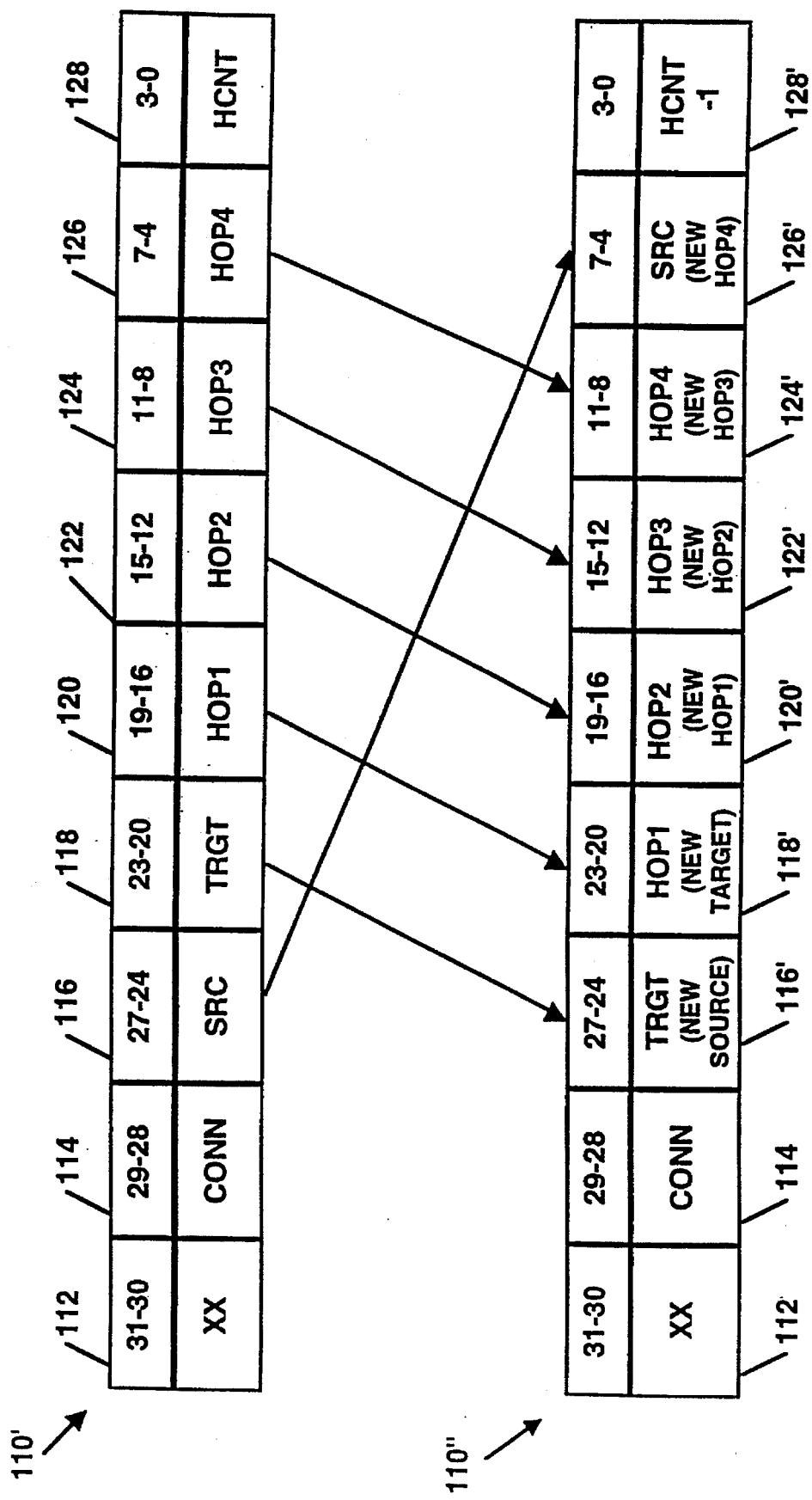
FIG. 3 shows an illustrative header format associated with a transmitted QuickRing™ packet and an illustrative header format associated with a rotated QuickRing™ packet.

Referring to FIG. 3, an illustrative QuickRing™ packet header 110' is shown. The first two bits 112 of the header 110' are unused. The second field 114 of the header 110', at bits twenty-nine through twenty-eight, provides a connection field defining the transmission type as normal (i.e., where the payload includes seventy-nine words) or low bandwidth (i.e., where the payload is one word). A source field 116, at bits twenty-seven through twenty-four of the header 110', contains the address of the source port of the source node $12_A$–$12_L$ and a target field 118, provided at bits twenty-three through twenty of the header 110', contains the address of the destination port of the packet receiving, or destination node $12_A$–$12_L$. Note that the port addresses contained in the source and target fields 116, 118 are the addresses of the respective source and target ports on the ring 14–26 to which the port is connected. When a packet is transmitted by a node, the transmitting one of the QuickRing™ interface circuits 50–64 inserts the address of the respective, transmitting port into the source field 116.

The next four fields 120, 122, 124, and 126, each four bits in length, are referred to as hop fields one through four, respectively. When a packet is transmitted from a source node to an indirectly connected destination node, the hop fields contain the hops necessary for routing the packet to the destination port of the destination node. Thus, the addresses of the ports receiving and transmitting the packet as the packet hops across nodes are provided in the hop fields 120–126, with the first port to be hopped specified in the first hop field 120, the second port to be hopped specified in the second hop field 122, etc. Note that since, in the preferred embodiment, there are four nodes connected to each ring 14–26, only two bits of the four bit hop fields 120–126 are used to provide the specified port address. In order to facilitate processing of the packet header by a destination node, if a hop field is empty, the highest bit of the field is set. The last field 128 of the header 110', at bits three through zero, is referred to as a hop count field 128 and maintains a count of the number of nodes across which the packet is bridged. Specifically, the number of hops that a packet is to make is entered in the hop count field 128. Each time the packet is bridged, the hop count field 128 is decremented by one.

In operation, when a packet is received at a port, the receiving interface circuit 50–64 associated with that port determines whether the packet is intended for the receiving node. This determination is achieved by comparing the port address specified in the target field 118 of the header 110' of the received packet to the port address of the receiving port. If the target field address matches the receiving port address, then the packet is intended for the receiving node. Alternatively, the packet is passed thorough the receiving port of the receiving node to continue along the ring from which it was received. For example, consider that port $P_{A0}$ of illustrative node $12_A$ receives a packet on ring 14. Interface circuit 50 determines whether the target address specified in the packet is the address of port $P_{A0}$. If these addresses are not the same, then the packet is passed through interface circuit 50 to continue on ring 14 via terminal 32 of circuit 50.

If it is determined by a receiving port that a received packet is intended for the respective node, then the interface circuit determines whether the hop count field 128 of the header of the received packet contains a value of zero. If the hop count field 128 is at zero, then the receiving interface circuit transmits the packet to the processor and memory unit associated with the receiving node. If, alternatively, the hop count field 128 has not been received as zero, then the packet is bridged by the bridge associated with the receiving node. For example, assume that a packet received by port $P_{A0}$ of node $12_A$ is determined to be intended for node $12_A$ (i.e., because the target field of the header contains the address of the receiving port). In this case, interface circuit 50 determines whether the hop count field of the received packet header is at zero. If the hop count field is at zero, then the packet is forwarded to processor 40 for processing. Alternatively, if the hop count field is not at zero, then the packet is bridged from interface circuit 50 to interface circuit 52 via bridge 90, for further transmission on ring 22.

As mentioned, when a packet is bridged across a node, the packet header 110' is rotated to provide a rotated packet header 110" having a format also shown in FIG. 3. More specifically, the content of the source field 116 of header 110' is moved to bits seven through four to provide a new HOP4 field 126'. Additionally, the contents of each of the fields 118–126 of the transmitted packet 110' of FIG. 3 are shifted up by four bits, to provide rotated fields 116', 118', 120', 122', and 124' of header 110" shown in FIG. 3. Thus, the content of target field 118 is moved to field 116' at bits 27-24 to specify a new source, the content of the first hop field 120 is moved to field 118' at bits 23-20 to specify a new target. Similarly, second through fourth hop fields 122, 124, and 126 are moved to provide new first through third hop fields 120', 122' and 124' at bits 19-16, 15-12, and 11-8, respectively, of header 110" as shown. In this way, each time a packet hops across a node, the header is rotated to specify a new source and target node accordingly. The hop count field 128' contains a value equal to the value in the hop count field 128 decremented by one.

To illustrate the rotation of the packet header 110', consider the case where a packet is transmitted from node $12_A$ to node $12_F$ via an intermediate node $12_B$ (FIG. 2). Note that the route that the packet travels is selected from a routing table maintained by source node $12_A$ and initialized in a manner described below. Specifically, consider where the packet is transmitted from port $P_{A0}$ of node $12_A$ over ring 14 to port $P_{E0}$ of node $12_E$. In node $12_E$, the packet is bridged by bridge 92 (FIG. 2) to port $P_{E1}$ for transmission on ring 24 to port $P_{F1}$ of destination node $12_F$. In this case, the source field 116 of the transmitted header 110' contains the address of source port $P_{A0}$ of node $12_A$ on ring 14, the target field 118 of the header 110' contains the address of port $P_{E0}$ of node $12_E$ and the first hop field 120 contains the address of the destination port $P_{F1}$ of node $12_F$. Since the packet must make one hop to arrive at destination node $12_F$, the hop count field 128 is initialized to a value of one and hop fields 120–126 are empty (i.e., with the high bit set).

When the packet is received by node $12_E$, the header 110' is rotated to provide a packet header 110", as shown in FIG. 3. Specifically, the source address of port $P_{A0}$ of node $12_A$ is now at bits seven through four, the target address of port $P_{E0}$ of node $12_E$ is now at bits twenty-seven through twenty-four to specify the new source, and the first hop address of port $P_{F1}$ of node $12_F$ is at bits twenty-three through twenty to specify the new target. The new source field 116' is modified to contain the address of transmitting port $P_{E1}$ and the hop count field is decremented to a value of zero to indicate that the packet is intended to be received at node $12_F$. The packet header 110" thus rotated is transmitted from new source port $P_{E1}$ of node $12_E$ to destination port $P_{F1}$ of node $12_F$ via ring 24.

With the information contained in the rotated header 110", the destination node $12_F$ is provided with general information regarding the route that the packet travelled to reach the destination node. Specifically, the packet header 110" indicates that the packet originated at source port $P_{A1}$ and that the packet made one hop based on the high bit being set in hop fields 120', 122' and 124'. However, knowledge of which nodes (as opposed to which ports) the packet travelled through requires additional information.

Referring to FIG. 4A, a routing payload 150 is provided for transmission with a packet header 110. When the routing payload 150 is propagated in accordance with a propagation technique described below in conjunction with FIG. 5, the packet is referred to as a discovery packet. Discovery packets are propagated by each node at system initialization so that each node $12_A$–$12_L$ can learn the routes to every other node. The learned routes to other nodes may be stored in a routing table in memory. Discovery packets are also propagated by a new node added to the network during operation so that other nodes can learn the route to the new node, as will be discussed. The routing payload 150 may also be transmitted by a node directly to another node (i.e., rather than being propagated to all nodes in accordance with the technique of FIG. 5) in the form of a routing information packet.

Figure 5:
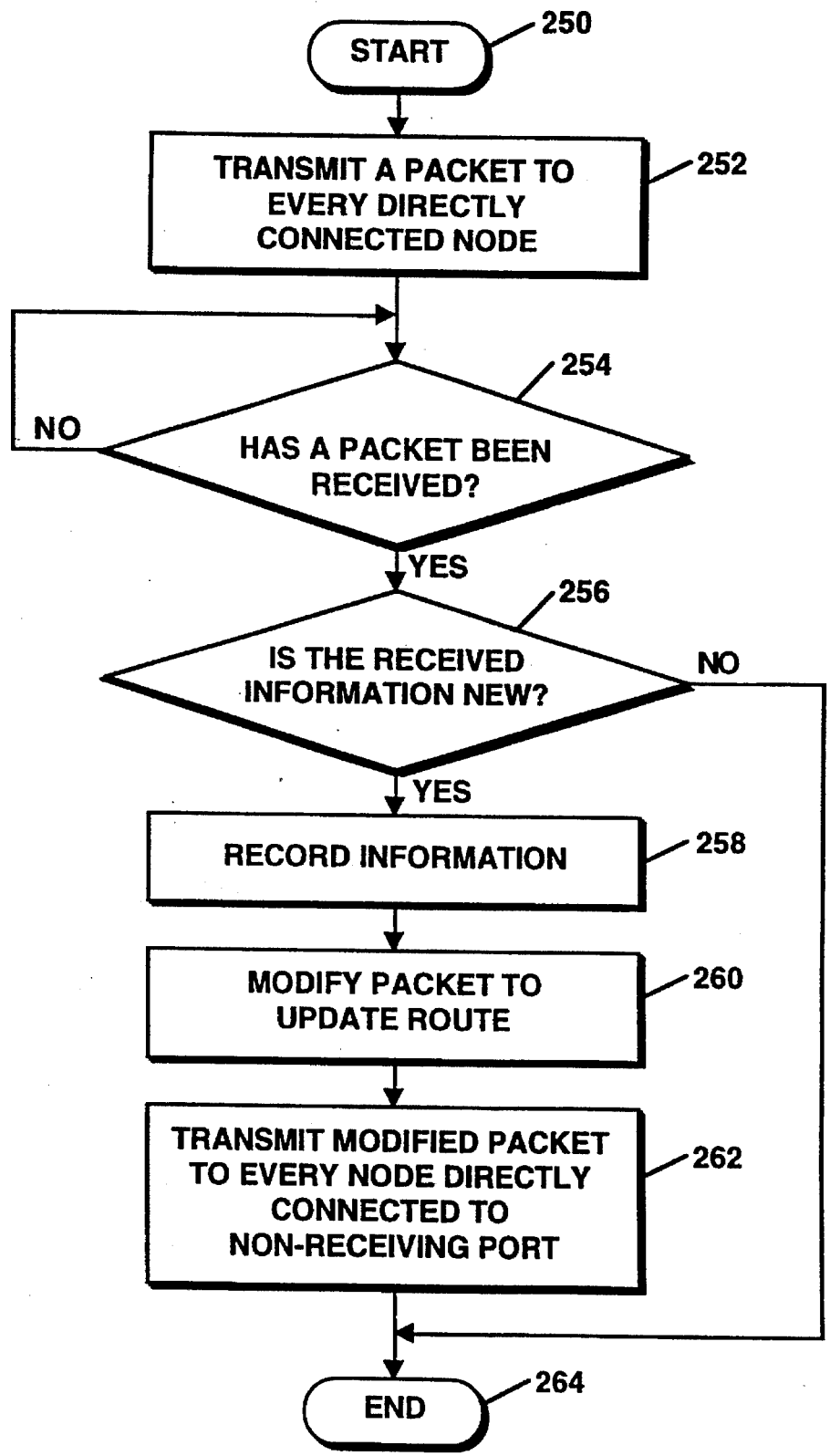
FIG. 5 is a flow diagram of an illustrative process by which packets are propagated through a network.

The routing payload 150 of FIG. 5 is shown to include a type field 154, at bits thirty-one through twenty-eight, identifying the packet as being a discovery packet which is propagated through the network 10 upon initialization or when a new node $12_A$–$12_L$ is added to the network 10 or, alternatively, as a routing information packet which is sent from one node to another. A sender slot field 158, at bits twenty-seven through twenty-four, contains the address of the slot in which the source node $12_A$–$12_L$ is located. A one bit identifier of the port of the source node from which the packet is transmitted is provided in a sender port field 162. That is, the one bit port identifier specifies whether a port is the first $P_0$ or second $P_1$ associated with the source node identified in field 158, as contrasted to the four bit address of a port on a ring contained in the packet header 110. Four bit hop slot fields 166, 174 and 182 contain the slot address associated with the first through third nodes across which the packet hops, respectively, and corresponding single bit hop port fields 170, 178 and 186 contain an identifier of the port associated with the hopped nodes through which the packet travels (i.e., the hop port fields specify whether the port is the first port $P_0$ associated with the node or the second port $P_1$ associated with the node). A hop count field 194 follows a five bit reserved field 190 and contains a value specifying the number of hops the packet has made. While the packet header 110 discussed above provides partial information regarding the route travelled by a packet, a packet's route is completed by the routing payload 150. Specifically, the header 110 does not indicate which ports the packet hopped, whereas the routing payload 150 provides such information.

In the case where a routing payload 150 is part of a discovery packet, if it is determined by a node receiving the packet that the packet is to be forwarded to other nodes (FIG. 5), the payload 150 is manipulated at the receiving/forwarding node to identify the forwarding node prior to forwarding the packet to other nodes, in a manner discussed below. In this way, when a discovery packet is received by a node, it contains a complete route back to the source node, including ports and nodes through which the packet travelled. The route specified by a discovery packet is stored in memory by each node receiving the packet to provide a routing table or map, as will be discussed.

A routing information packet differs from a discovery packet only in the method of propagation. The content of both a discovery packet and a routing information packet includes a packet header 110 and a routing payload 150. However, while a discovery packet is propagated in accordance with the technique of FIG. 5, a routing information packet is transmitted from a source node to a single destination node. By modifying the route contained in the routing payload 150 to identify intermediate nodes across which the packet hops in the manner described below, the destination node receiving a routing information packet is provided with information regarding the route travelled by the packet.

Referring also to FIG. 4B, a node status payload 200 for transmission with a header 110 to provide a node status packet is shown. The payload 200 contains a type field 204 at bits thirty-one through twenty-eight specifying the type of source node, such as a data storage controller node or a network controller node. A sender slot field 208 contains the address of the slot in which the source node is contained and, in the case where the nodes $12_A$–$12_L$ are housed in more than one cabinet, the field 208 additionally includes a cabinet identifier.

A ring "A" port address field 212 is provided at bits nineteen through sixteen and contains the address of the port on the first ring to which the node is connected. Similarly, a ring "B" port address field 216 is provided at bits fifteen through twelve and contains the address of the port on the second ring to which the node is connected. For example, in the case of a node status payload 200 transmitted by node $12_A$, the ring "A" port address field 212 contains the address of port $P_{A0}$ on ring 14 and the ring "B" port address field 216 contains the address of port $P_{A1}$ on ring 22.

A port status field 220 is provided at bits eleven and ten and indicates the status of the node's ports. Specifically, bit eleven indicates the status of the first port $P_0$ associated with the respective node and bit ten indicates the status of the second port $P_1$ of the node. An info request field 224 is provided at bits nine and eight and indicates whether information is being requested by the source node. Specifically, a value of zero in the info request field 224 specifies that no information is being requested, a value of one specifies that routing information is requested (i.e., a request that a routing information packet be returned to the source node) and a value of two specifies that node status is requested (i.e., a request that a node status packet be returned to the source node). Finally, an eight bit node type field 228 is provided at bits seven through zero for specifying the source node type.

Referring to FIG. 5, an illustrative process by which a packet is propagated to every node $12_A$–$12_L$ on the network 10 is shown. In step 250, the condition initiating packet propagation occurs, such as either network initialization or the addition of a new node to the network in the case of propagation of a discovery packet or a node status change in the case of propagation of a node status packet. In step 252, one or more source nodes connected to the network 10 sends a packet having a header 110' of the format shown in FIG. 3 and a payload of the format shown in FIG. 4A or 4B to every other node directly connected thereto. More particularly, a packet is sent via the first port of the source node to every other node directly connected to the first port on a common ring and a packet is sent via the second port of the source node to every other node directly connected to the second port on a common ring. For example, in the case of packet propagation from source node $12_B$ (FIG. 1), a first packet is sent via port $P_{B0}$ to node $12_A$, a second packet is sent via port $P_{B0}$ to node $12_C$ and a third packet is sent via port $P_{B0}$ to node $12_D$, each of such nodes $12_A$, $12_B$, $12_C$ and $12_D$ being directly connected to common ring 22. Similarly, node $12_B$ sends a fourth packet via port $P_{B1}$ to node $12_F$ and a fifth packet via port $P_{B1}$ to node $12_J$, such nodes $12_B$, $12_F$ and $12_J$ being directly connected to common ring 16.

Thereafter, in step 254, one or more nodes determines whether a packet has been received. Step 254 is .repeated until a packet is received. Once a packet is received, step 256 is performed in which it is determined whether the received packet contains new information (i.e., information not previously received by the receiving node). This step is achieved by comparing the payload 150 or 200 of the received packet with entries in the memory associated with the receiving node. For example, if a discovery packet is received on port $P_{A0}$ of node $12_A$ in step 254, in step 256 it is determined whether the route contained in the discovery packet payload 150 is already stored in memory 40 (FIG. 2). If it is determined that the route was previously received (i.e., because an entry in memory corresponds to the received route), then propagation of the packet is terminated in step 264.

Alternatively, if it is determined in step 256 that the information contained in the received packet is new, then the information contained in the packet may be stored by the receiving node in memory in step 258 (i.e., such as memory devices 40–46 of respective nodes $12_A$, $12_E$, $12_B$, $12_F$ shown in FIG. 2). For example, in the case where the packet is a discovery packet or routing information packet, the receiving node stores the slot address of the source node specified in field 158 of the routing payload 150 (FIG. 4A), the port address of the source node from the packet header 110 and the complete route to the source node specified in the routing payload 150 (including the addresses of the nodes through which the packet is transmitted). Note that in some instances, it may be desirable to selectively store such information. For example, it may be desirable to store only routes containing a predetermined number of hops or fewer. In the case where the packet is a node status packet, the receiving node stores the address of the slot in which the source node is located from field 208 of the node status payload 200 (FIG. 4B) and the status of the source node from field 220 of the node status payload 200. Note that the route travelled by a node status packet, as specified by the port addresses across which the packet is transmitted and contained in the packet header, may also be stored.

Thereafter, in step 260, the packet is modified in preparation for forwarding to additional nodes in step 262. Packets propagated in accordance with the technique of FIG. 5 are not "automatically" bridged in response to hops specified in the header. Rather, if it is determined in step 256 that the packet information is new, then the packet will be forwarded directly to nodes connected to the non-receiving port of the receiving node in step 262. Thus, prior to such forwarding, the header 110 must be manually manipulated to update the route identified therein. Specifically, the header 110 is modified to specify the directly connected nodes to which the packet is thereafter transmitted in step 262 and to set the number of hops in the hop count field of the header to zero (since the packet is being transmitted directly to such directly connected nodes). In the case of propagation of a discovery packet or a routing information packet, step 260 additionally includes modification of the route information contained in the routing payload 150, as described below.

Thereafter, in step 262, the modified packet is forwarded to every other node directly connected to the non-receiving port of the receiving node. For example, consider the case where port $P_{F0}$ of node $12_F$ (FIG. 1) receives a packet transmitted by node $12_B$ on ring 16 in step 254 and where it is determined in step 256 that the packet information is new. In this case, node $12_F$ modifies the packet header 110 in step 260 to specify the nodes $12_E$, $12_G$, and $12_H$ connected to the same ring 24 as the non-receiving port $P_{F1}$ of the node $12_F$ to which the packet will be forwarded. That is, the packet header is modified a first time to specify port $P_{E1}$ as the target and this modified header is transmitted with the payload containing new information to node $12_E$, the header is modified a second time to specify port $P_{G1}$ as the target and this modified header is transmitted with the payload containing new information to node $12_G$, and the header is modified a third time in a like manner for transmission to node $12_H$. Thereafter, in step 262, node $12_F$ transmits the modified packet to each of nodes $12_E$, $12_G$ and $12_H$. The packet propagation process is terminated in step 264.

By way of illustration, consider use of the propagation technique of FIG. 5 to provide routing information to each of the nodes $12_A$–$12_L$ at system initialization. In this case, in step 252, each node $12_A$–$12_L$ transmits a discovery packet to every other directly connected node and in step 254, it is determined whether a discovery packet has been received by a receiving node. Once a node receives a packet, it is determined in step 256 whether the table maintained in the memory associated with the receiving node contains the route from the source port of the source node to the receiving port of the receiving node as specified in the discovery packet.

Assuming that the route contained in the payload 150 is new, in step 258, the receiving node stores the slot address of the source node and the route from the source node to the receiving node as specified in the routing payload 150 as well as the address of the source port of the source node specified in the packet header. Thereafter, the packet is modified in step 260 by inserting information about the receiving node in the routing payload 150. Specifically, the payload 150 (FIG. 4A) is modified by incrementing the hop count field 194 and filling in the appropriate slot address and port identifier fields (i.e., the HOP1 SLOT field 166 and the HOP1 PORT field 170) with the slot address of receiving node and the identifier of the receiving port of the receiving node, respectively. Additionally, the header is modified, as described above, to specify the nodes directly connected to the non-receiving port of the receiving node to which the packet is forwarded and the hop count field 194 is set to zero for forwarding the modified packet to such nodes.

For example, when a discovery packet is transmitted by node $12_A$ to node $12_E$ which is directly connected to the source node $12_A$ via ring 14, the header 110' (FIG. 3) as transmitted from port $P_{A0}$ has entries specified in Table I and the routing payload 150 of the discovery packet has entries specified in Table II:

TABLE I

| Field | Contents |
|---|---|
| SRC 116 | address of port $P_{A0}$ of node $12_A$ |
| TRGT 118 | address of port $P_{E0}$ of node $12_E$ |
| HOP1 120 | empty (high bit set) |
| HOP2 122 | empty (high bit set) |
| HOP3 124 | empty (high bit set) |
| HOP4 126 | empty (high bit set) |
| HCNT 128 | zero (discovery packets are not bridged but rather, are processed by a processor of a receiving node which determines whether to forward the packet to other nodes directly connected to the non-receiving port of the receiving node) |

TABLE II

| Field | Contents |
|---|---|
| SENDER SLOT 158 | slot address of node $12_A$ |
| SENDER PORT 162 | port identifier of port $P_{A0}$ of node $12_A$ |
| HOP1 SLOT 166 | empty |
| HOP1 PORT 170 | empty |
| HOP2 SLOT 174 | empty |
| HOP2 PORT 178 | empty |
| HOP3 SLOT 182 | empty |
| HOP3 PORT 186 | empty |
| HCNT 194 | zero |

When the packet specified in Tables I and II is received by port $P_{E0}$ of node $12_E$, processor 40 (FIG. 2) determines whether the table in the memory 42 associated with node $12_E$ contains the route specified in the routing payload 150 of the received packet. Assuming that the routing table does not contain the received route, the route specified in the received packet is stored in memory, along with the slot address and the port address of the source node $12_A$. The header 110' is manually manipulated by node $12_E$ in preparation for forwarding the packet to nodes $12_F$, $12_G$ and $12_H$ which are directly connected to the non-receiving port $P_{E1}$ of node $12_E$ via ring 24 and the routing payload 150 is modified to include information about receiving/forwarding node $12_E$, so as to complete the route contained therein. Considering the packet as forwarded to node $12_F$, the header is rotated and modified by node $12_E$ to contain the entries specified in Table III and the payload 150 is modified to contain the entries specified in Table IV.

TABLE III

| Field | Contents |
|---|---|
| TRGT 116' (the new source) | address of port $P_{E1}$ of node $12_E$ |
| HOP1 118' (the new target) | address of port $P_{F1}$ of node $12_F$ |
| HOP2 120' | empty (high bit set) |
| HOP3 122' | empty (high bit set) |
| HOP4 124' | empty (high bit set) |
| SRC 126' (the new hop 4) | address of port $P_{A1}$ of node $12_A$ |

TABLE III-continued

| Field | Contents |
|---|---|
| HCNT 128' | zero |

TABLE IV

| Field | Contents |
|---|---|
| SENDER SLOT 158 | slot address of node $12_A$ |
| SENDER PORT 162 | port identifier of port $P_{A0}$ of node $12_A$ |
| HOP1 SLOT 166 | slot address of node $12_E$ |
| HOP1 PORT 170 | port identifier of port $P_{E1}$ of node $12_E$ |
| HOP2 SLOT 174 | empty |
| HOP2 PORT 178 | empty |
| HOP3 SLOT 182 | empty |
| HOP3 PORT 186 | empty |
| HCNT 194 | one |

Once the destination node $12_F$ receives the packet of Tables III and IV, the packet propagation process of FIG. 5 is repeated by node $12_F$. Specifically, node $12_F$ determines whether the route contained in the received packet is new and, if so, stores the new information, modifies the packet header and routing payload, and forwards the modified packet to nodes directly connected to the non-receiving port $P_{F0}$ of the receiving node $12_F$.

With this arrangement, each node in the network is taught information regarding the network configuration which enables the subsequent transmission of packets between the nodes $12_A$–$12_L$. Specifically, once the discovery packet propagation is completed, each node $12_A$–$12_L$ contains in memory a list of one or more routes to every other node on the network. Moreover, this knowledge of network configuration is obtained without requiring operator intervention, maintenance of a dedicated bus, or prior knowledge of the network configuration. Furthermore, the propagation technique of FIG. 5 prevents unnecessary circulation of packets once network configuration information has been provided. This advantage is achieved by terminating packet propagation when a node receives information of which it is already aware (steps 256 and 264 in FIG. 5).

Recall that a discovery packet may also be transmitted by a new node when such new node is initialized after being added to the network (i.e., hot-plugged) during operation. In this case, in step 252, only the new node transmits a discovery packet to every other directly connected node. In step 256, it is determined whether the route contained in the discovery packet was previously recorded in the memory associated with the receiving node. If the packet is determined to contain new information, then, in step 258, the directly connected nodes receiving the discovery packet from the new node record the route to the new node as specified in the routing payload 150 contained in the discovery packet. Thereafter, the packet is modified in step 260 by inserting information about the receiving node in the routing payload 150 and the header is modified, as described above. Alternatively, if the received route information is not new, then the packet propagation is terminated.

Additionally, in the case of receipt of a discovery packet from a new node, the receiving nodes return a routing information packet directly to the new node. The new node records the routes contained in the routing information packets in order to build its own routing table for subsequent transmission of packets to the other nodes.

Consider next use of the packet propagation technique of FIG. 5 in conjunction with the propagation of a node status packet. This type of a transmission occurs when the status of a node changes. For example, when a port of a node experiences a failure, the node sends a node status packet to alert all other nodes of this condition. In this case, a node status packet is transmitted in step 252. Note that, unlike use of the technique of FIG. 5 in which nodes learn the routes to all other network nodes at initialization, in the case of transmission of a node status packet, it may be just one node transmitting such a packet to all nodes to which it is directly connected.

In step 254, it is determined whether a node status packet has been received and in step 256, it is determined whether the received node status is new. If it is determined that the received node status is not new, then the process is terminated in step 264. Alternatively, if the node status is new, then the node status information contained in the packet is recorded in memory by the receiving node. Specifically, in step 258, the routing table maintained by the receiving node is updated in accordance with the status received. For example, if the status indicates that a port of the source node is inoperable, then the routing table is purged of routes which include the failed port.

In step 260, the header of the node status packet is modified in preparation for forwarding the packet to directly connected nodes. Specifically, the hop count field 128' (FIG. 3) is set to zero and field 118' is updated for each directly connected node to which the packet is to be forwarded. Thereafter, in step 262, the modified packet is transmitted from the non-receiving port of the receiving node to nodes to which it is directly connected and the process is terminated at step 264, as shown.

In addition to providing an improved process for teaching nodes network configuration information at system initialization, the packet propagation technique described herein also provides an effective way of dynamically updating routing tables maintained by the nodes during operation. Specifically, the propagation of a discovery packet by a new node added to the network during operation (i.e., after system initialization) permits other nodes on the network to route packets through the new node. Also, requiring the receiving nodes to respond to a discovery packet from a new node with a routing information packet provides a mechanism for teaching the new node routes to the other nodes in the network.

Propagation of a node status packet by a node upon a status change, such as a port failure, advantageously permits the other nodes to dynamically update their routing tables to avoid routing to an inoperable node. Thus, use of the techniques described herein eliminates the need for operator intervention, maintenance of a dedicated bus system, and other drawbacks heretofore associated with teaching nodes routes to each other at system initialization, routes to a new node, hot-plugged into the network during operation, and which routes to avoid due to a failure or other status change.

Figure 6:
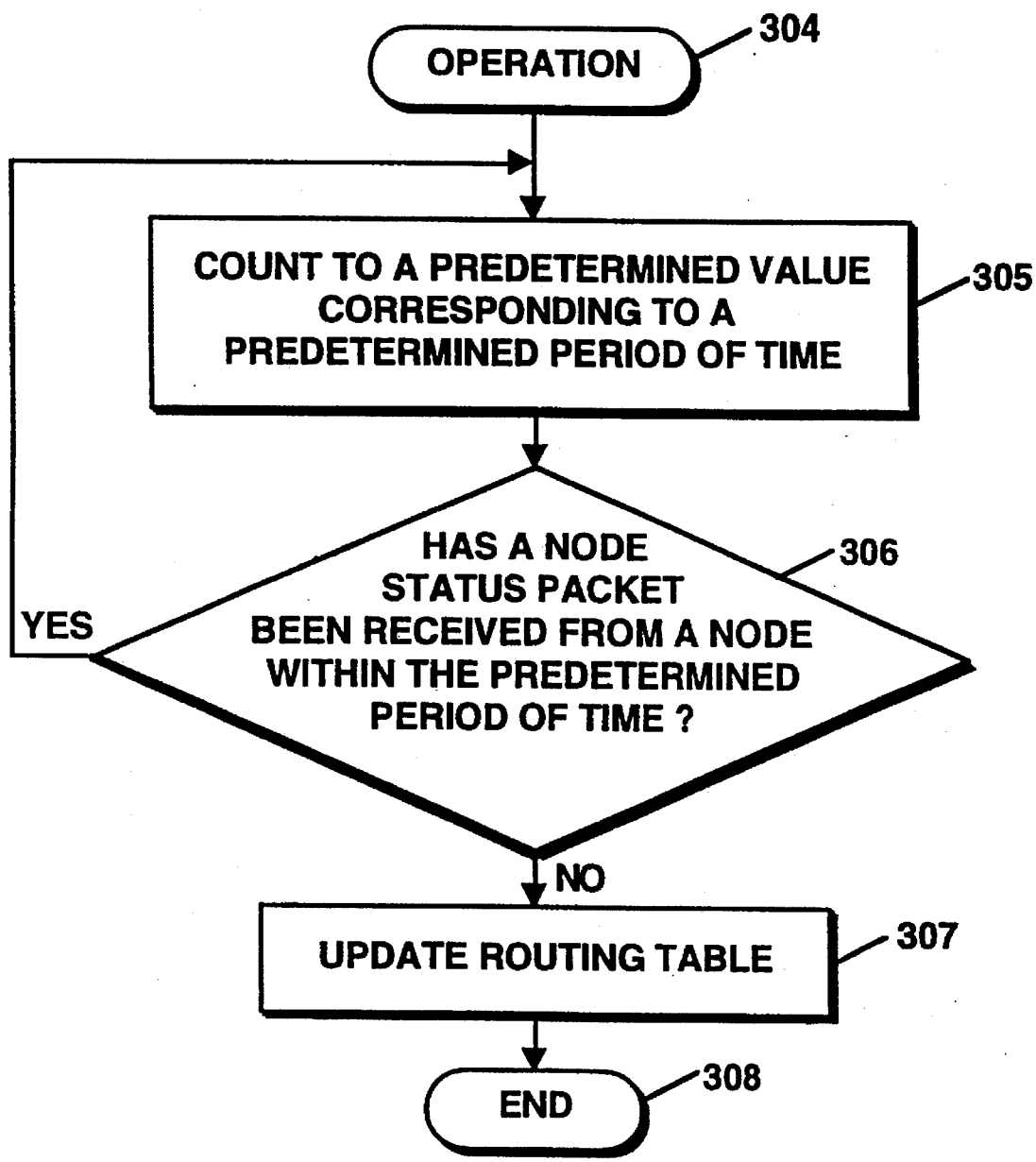
FIG. 6 is a flow diagram of a node status monitoring process.

Referring to FIG. 6, a node status monitoring process is shown for monitoring nodes in conjunction with the periodic propagation of a node status packet from each node $12_A$–$12_L$ to every other node in accordance with the technique of FIG. 5. The node monitoring process of FIG. 6 can be carried out at any point during network operation, once the initialization process by which the nodes learn the network configuration has occurred, starting at process step 304. In step 305, a counter contained in each of the nodes $12_A$–$12_L$ (i.e., in the processor and memory unit 40–46 shown in FIG. 2) which monitor the status of other nodes counts to a predetermined value corresponding to a predetermined interval at which it is desired to check the status of the other nodes on the network 10.

In step 306, the monitoring node determines whether it has received a status packet from each monitored node within the predetermined time interval. If it is determined that such a packet has been received during the specified interval, then the process is repeated starting at step 305.

Alternatively, if it is determined that the monitoring node has not received a node status packet from a monitored node during the predetermined interval, then process step 307 is performed in which the routing table maintained by the monitoring node is updated. Failure to receive a status packet from a monitored node in the predetermined time causes the monitored node to be removed from routing paths maintained in the monitoring node's routing table, either because the node has been removed from the network or because the node has experienced a failure. Thus, in step 307, the routing table of the monitoring node is purged of all paths to the non-responsive, monitored node and all paths containing the non-responsive node therein (i.e., routes that require a hop across the non-responsive node).

Referring to FIG. 7, a data processing network 310 is shown to include a storage server 312 coupled between end-user devices 314 and data storage devices 316. The storage server 312 includes a backplane 318 having multiple disk controller boards, or nodes $320_A$–$320_D$ connected thereto and interconnected in accordance with the topology of the above-incorporated co-pending patent application.

The end user devices 314 may comprise various types of computers 314a–n, such as workstations, adapted for networked data communication. The computers 314a–n are interconnected by a network 322 of a conventional type. The data storage devices 316 comprise multiple disk drives 316a–n, a plurality of which are preferably redundant. The disk drives 316a–n are interconnected by a network 324 of a conventional type.

The storage server 312 controls communication of the computers 314a–n with the data storage devices 316. To this end, the storage server 312 is coupled to both the end-user devices 314 via a bidirectional bus 326 and to the data storage devices 316 via a bidirectional bus 328. With this arrangement, the computers 314a–n can be physically spaced apart for user convenience, while still having the ability to access the centralized storage devices 316. For example, the data storage devices 316 may be housed in a centrally located card cage, or cabinet in proximity to a card cage housing the storage server 312, whereas the computers 314a–n are decentrally located throughout a user facility.

Each of the disk controllers $320_A$, $320_B$, $320_C$, and $320_D$ includes a processor $332_A$, $332_B$, $332_C$, $332_D$ and a memory device $334_A$, $334_B$, $334_C$, and $334_D$, respectively. The controllers $320_A$–$320_D$ are connected to the backplane 318 via conventional pin connectors and are interconnected via conductive traces on the backplane. A conventional power supply 330 is coupled to the backplane 318 for providing power to the controllers $320_A$–$320_D$.

Rings 336–342 interconnect the controllers $320_A$–$320_D$ in accordance with the invention described in the above referenced co-pending patent application to provide enhanced fault tolerance to the system 310. The controllers $320_A$–$320_D$ implement the discovery packet propagation technique described above in conjunction with FIG. 5 upon initialization and are capable of transmitting routing information packets and node status packets therebetween in the manner discussed above.

Having described preferred embodiments of the invention, it will be apparent to one of skill in the art that other embodiments incorporating the novel concepts may be employed. Accordingly, the invention should be limited only by the spirit and scope of the appended claims.

I claim:

1. A method for propagating a packet in an n×m network of nodes, each node being connected to at least two interconnecting segments, comprising the steps of:

transmitting said packet from a transmitting one of said nodes to a first plurality of said nodes connected directly to a first interconnecting segment;

receiving said packet at a receiving one of said first plurality of nodes, said receiving node being further connected to a second interconnecting segment; and forwarding said packet from said receiving node to a second plurality of nodes connected directly to said second interconnecting segment if information contained in said packet has not been previously received by said receiving node.

2. The method recited in claim 1 further comprising the step of terminating propagation of said packet if said information contained in said packet has been previously received by said receiving node.

3. The method recited in claim 1 further comprising the step of storing said information contained in said packet at said receiving node if said information has not been previously received by said receiving node.

4. The method recited in claim 1 wherein each of said interconnecting segments is a ring and wherein said method further comprises the step of connecting each of said nodes to each of said at least two rings with a QuickRing™ interface circuit.

5. The method recited in claim 1 wherein said packet contains a routing payload and said information contained in said packet includes a route from said transmitting node to said receiving node.

6. The method recited in claim 5 further comprising the step of modifying said routing payload to include said receiving node in said route prior to forwarding said packet.

7. The method recited in claim 1 wherein said packet is a node status packet and said information contained in said packet includes status of said transmitting node.

8. A method for providing nodes of a network with network configuration information, each of said nodes having at least a first port connected to a first interconnecting segment and a second port connected to a second interconnecting segment, wherein each of said nodes is directly connected to ones of said nodes which are connected to one of said first interconnecting segment and said second interconnecting segment and is indirectly connected to ones of said nodes which are not connected to one of said first interconnecting segment and said second interconnecting segment, said method comprising the steps of:

transmitting a discovery packet from a transmitting one of said nodes to said directly connected nodes, said discovery packet containing a route from said transmitting node;

receiving said discovery packet at a receiving one of said directly connected nodes; and forwarding said discovery packet from said receiving node to said indirectly connected nodes if said route contained in said discovery packet has not been previously received by said receiving node.

9. The method recited in claim 8 further comprising the step of terminating propagation of said packet if said packet has been previously received by said receiving node.

10. The method recited in claim 8 further comprising the step of recording at said receiving node, a slot identifier indicating a slot in which said transmitting node is located, a port identifier indicating the one of said first port and second port of said transmitting node from which said discovery packet is transmitted, and said route contained in said discovery packet.

11. The method recited in claim 8 wherein each of said interconnecting segments is a ring and wherein said method further comprises the step of connecting a QuickRing™ interface circuit to said first and second ports of each of said nodes.

12. The method recited in claim 8 further comprising the step of modifying said discovery packet to identify said receiving node in said route.

13. The method recited in claim 8 wherein said discovery packet transmitting step is performed when said network is initialized.

14. The method recited in claim 8 wherein said transmitting node is a new node added to said network and said discovery packet transmitting step is performed when said new node is added to said network.

15. The method recited in claim 14 further comprising the step of transmitting a node status packet from said receiving node to said new node in response to receipt of said discovery packet from said new node.

16. A data storage subsystem comprising:

a plurality of disk controllers adapted for controlling signal transmission between at least one data storage device and at least one computer; and a plurality of rings, interconnecting said plurality of disk controllers, each of said plurality of disk controllers being connected to a different set of at least two of said plurality of rings, wherein each of said plurality of disk controllers includes a processor for receiving a packet from a transmitting one of said plurality of disk controllers connected to a first one of said at least two rings to which the respective disk controller is connected and forwarding said packet to one of said plurality of disk controllers connected to a second one of said at least two rings to which the respective disk controller is connected if said information contained in said packet was not previously received by said respective disk controller.

17. The data storage subsystem recited in claim 16 wherein each of said disk controllers further includes a QuickRing™ interface circuit connected to said at least two rings.

18. A method learning the location of nodes within a network comprising a plurality of multiport nodes each having at least first and second ports, wherein each port of each of said multiport nodes is coupled to one of a plurality of data links, comprising the steps of:

in a first transmitting step, transmitting a first packet from a first multiport node through at least one of said first and second ports to a first one of said plurality of data links, wherein said packet contains routing information comprising the address of said first multiport node and the port identification for the respective port of said multiport node;

receiving said first packet over said first one of said plurality of data links at a second multiport node through one of said at least first and second ports of said second one of said plurality of multiport nodes;

analyzing at said second multiport node said first packet to ascertain routing information contained within said first packet; and in a second transmitting step, transmitting a second packet from said second multiport node to a second data link coupled to another one of said at least first and second ports of said second multiport node if said routing information contained in said first packet is not recognized by said second node, wherein said second packet contains said first packet routing information and routing information for said multiport node comprising the address of said second multiport node and the port identification for the respective port of said second multiport node.

19. The method recited in claim 18 further comprising the step of repeating said receiving step, said analyzing step, and said second transmitting step at each of said plurality of multiport nodes.

20. The method recited in claim 18 further comprising the step of storing routing information contained in said first packet in a table within said second multiport node.

* * * * *

UNITED STATES PATENT AND TRADEMARK OFFICE
CERTIFICATE OF CORRECTION

PATENT NO. : 5,506,838
DATED : April 9, 1996
INVENTOR(S) : Kevin L. Flanagan

It is certified that error appears in the above-identified patent and that said Letters Patent is hereby corrected as shown below:

column 6, line 64, "intermediate node $12_B$" should read, --intermediate node $12_E$-- column 9, line 31, "12, ," should read --$12_J$ ,-- column 9, line 34, "is.repeated" should read --is repeated--

Signed and Sealed this

Twenty-eighth Day of April, 1998

Attest:

BRUCE LEHMAN

Attesting Officer

Commissioner of Patents and Trademarks